United States Patent
Kunze et al.

(10) Patent No.: US 11,430,126 B2
(45) Date of Patent: Aug. 30, 2022

(54) METHOD AND IMAGE PROCESSING APPARATUS FOR THE SEGMENTATION OF IMAGE DATA AND COMPUTER PROGRAM PRODUCT

(71) Applicant: Siemens Healthcare GmbH, Erlangen (DE)

(72) Inventors: Holger Kunze, Bubenreuth (DE); Alexander Gemmel, Erlangen (DE); Sarina Thomas, Heidelberg (DE); Klaus Maier-Hein, Heidelberg (DE)

(73) Assignee: Siemens Healthcare GmbH, Erlangen (DE)

( * ) Notice: Subject to any disclaimer, the term of this patent is extended or adjusted under 35 U.S.C. 154(b) by 23 days.

(21) Appl. No.: 17/090,020

(22) Filed: Nov. 5, 2020

(65) Prior Publication Data
US 2021/0142482 A1 May 13, 2021

(30) Foreign Application Priority Data
Nov. 13, 2019 (DE) .......................... 102019217524.4

(51) Int. Cl.
*G06T 7/11* (2017.01)
*G06K 9/62* (2022.01)
(Continued)

(52) U.S. Cl.
CPC .............. *G06T 7/11* (2017.01); *G06K 9/6256* (2013.01); *G06T 7/55* (2017.01); *G06T 19/20* (2013.01);
(Continued)

(58) Field of Classification Search
CPC ... G06T 7/11; G06T 7/55; G06T 19/20; G06T 2207/10081; G06T 2207/20081;
(Continued)

(56) References Cited

U.S. PATENT DOCUMENTS

| 5,926,568 A * | 7/1999 | Chaney ................ G06K 9/6206 382/217 |
| 8,050,473 B2 * | 11/2011 | Udupa ................ G06V 10/7553 382/128 |

(Continued)

OTHER PUBLICATIONS

Beichel, Reinhard, et al. "Robust active appearance models and their application to medical image analysis." IEEE transactions on medical imaging 24.9 (2005): 1151-1169.
(Continued)

*Primary Examiner* — Gregory M Desire
(74) *Attorney, Agent, or Firm* — Lempia Summerfield Katz LLC

(57) ABSTRACT

The disclosure relates to a method and to an image processing facility configured to carry out the method for the segmentation of image data of a target object. In the method, a first segmentation is generated by a trained algorithm. Furthermore, a statistical shape and appearance model is provided, which is trained on corresponding target objects. An interference region is further determined, in which the image data is impaired by an image artifact. A final segmentation of the image data is then generated by adjusting the shape and appearance model to the respective target object outside the interference region and using the first segmentation in the interference region.

15 Claims, 2 Drawing Sheets

1 Imaging device
2 Patient
3 Data processing facility
4 Input data interface
5 Processor
6 Data storage device
7 Program
8 First neural network
9 Second neural network
10 Shape and appearance model
11 Active shape model (ASM)
12 Active appearance model (AAM)
13 Output data interface
14 Output facility

(51) Int. Cl.
*G06T 19/20* (2011.01)
*G06T 7/55* (2017.01)

(52) U.S. Cl.
CPC ............... *G06T 2207/10081* (2013.01); *G06T 2207/20081* (2013.01); *G06T 2207/20112* (2013.01); *G06T 2219/2021* (2013.01)

(58) Field of Classification Search
CPC .. G06T 2207/20112; G06T 2219/2021; G06K 9/6256
See application file for complete search history.

(56) References Cited

U.S. PATENT DOCUMENTS

| | | | | |
|---|---|---|---|---|
| 8,111,885 | B2* | 2/2012 | Von Berg | G06T 7/149 |
| | | | | 382/128 |
| 8,165,359 | B2* | 4/2012 | Dewaele | G06T 7/149 |
| | | | | 382/128 |
| 8,295,575 | B2* | 10/2012 | Feldman | G06K 9/4619 |
| | | | | 382/131 |
| 9,292,933 | B2* | 3/2016 | Madabhushi | G06V 10/26 |
| 9,990,729 | B2* | 6/2018 | Kang | A61B 6/032 |
| 10,482,603 | B1* | 11/2019 | Fu | G06F 17/15 |
| 10,957,046 | B2* | 3/2021 | Albrecht | G06T 7/001 |
| 11,042,989 | B2* | 6/2021 | Linguraru | G06V 10/267 |
| 11,200,667 | B2* | 12/2021 | Lay | G06T 7/0012 |
| 2004/0120581 | A1* | 6/2004 | Ozer | G08B 13/19608 |
| | | | | 382/173 |
| 2008/0205721 | A1* | 8/2008 | Udupa | G06V 10/7553 |
| | | | | 382/128 |
| 2010/0266170 | A1 | 10/2010 | Khamene | |
| 2019/0237186 | A1* | 8/2019 | El-Baz | G16H 30/40 |
| 2021/0346091 | A1* | 11/2021 | Haslam | A61B 34/10 |

OTHER PUBLICATIONS

German Office Action for German Application No. 10 2019 217 524.4 dated Jul. 14, 2020.

\* cited by examiner

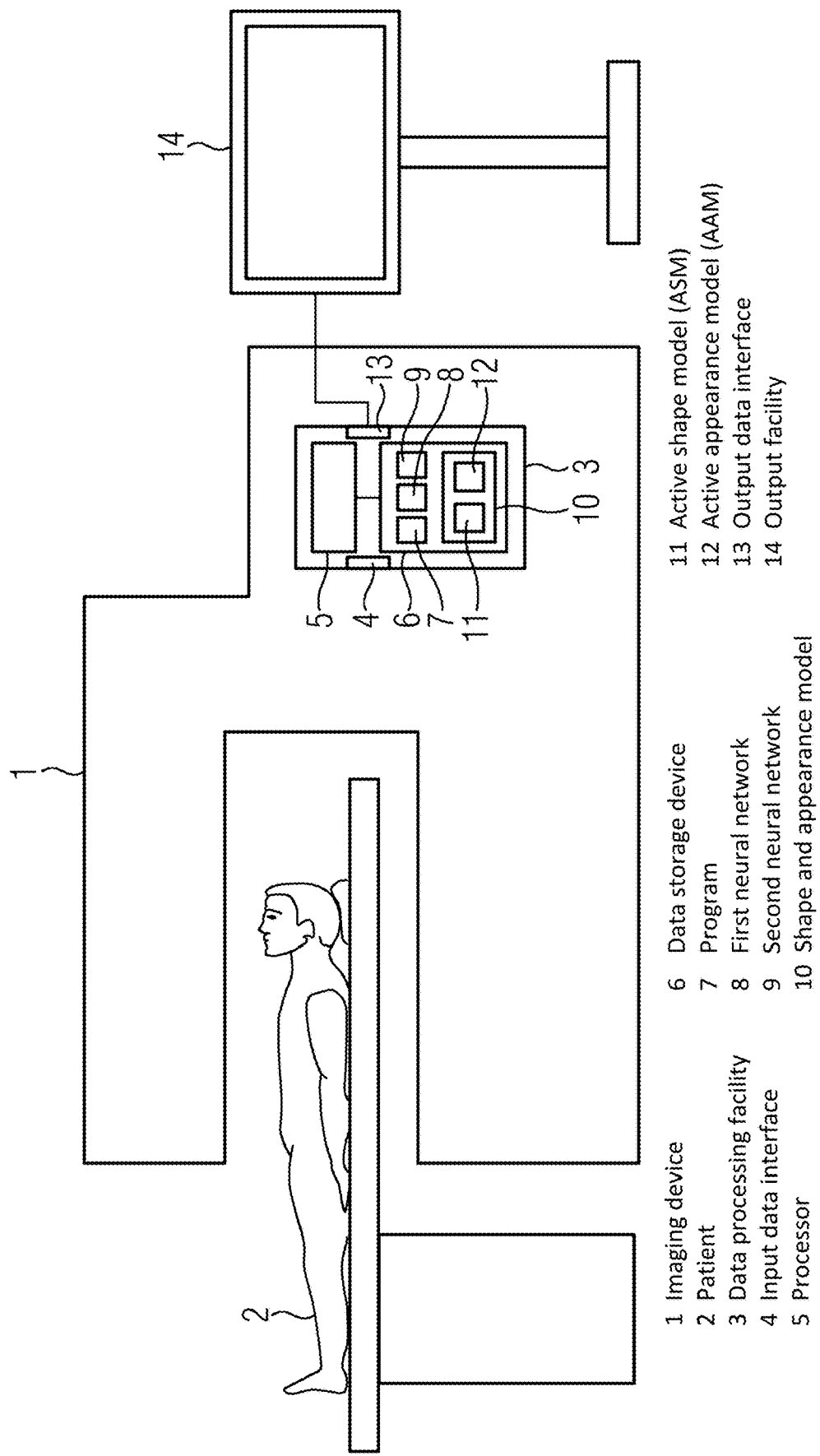

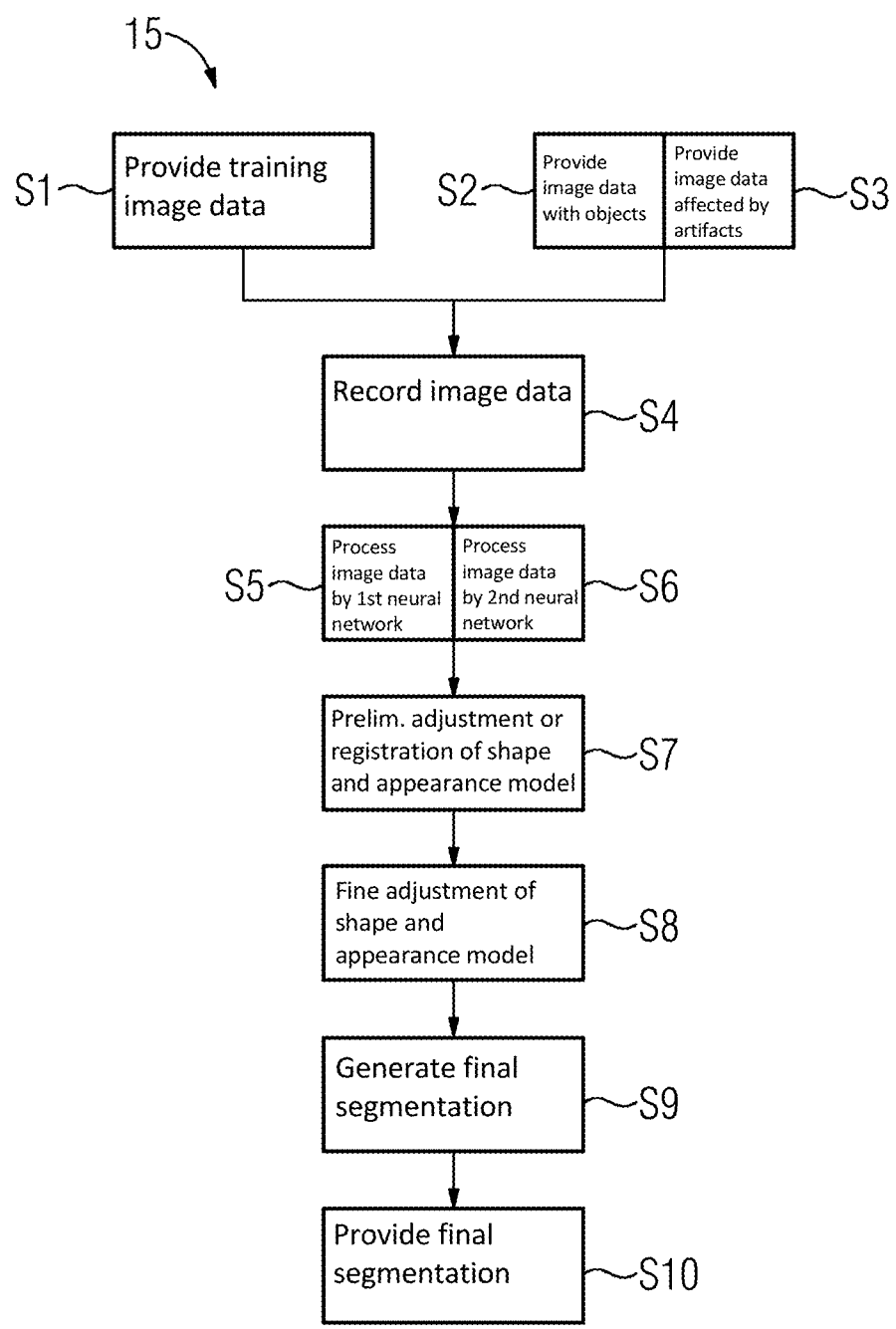

METHOD AND IMAGE PROCESSING APPARATUS FOR THE SEGMENTATION OF IMAGE DATA AND COMPUTER PROGRAM PRODUCT

The present patent document claims the benefit of German Patent Application No. 10 2019 217 524.4, filed Nov. 13, 2019, which is hereby incorporated by reference.

TECHNICAL FIELD

The disclosure relates to a method and an image processing apparatus for the segmentation of image data. The disclosure also relates to a corresponding computer program product.

BACKGROUND

In recent years, computer-supported imaging and image-processing medical technology has been successfully applied and further developed but continues to offer potential for further improvements. There are therefore segmentation and registration methods, for example, which, although they deliver good results when optimum output data is available, the accuracy or reliability thereof is not always satisfactory when interference or artifacts are present in the respective data.

SUMMARY AND DESCRIPTION

It is an object of the present disclosure to enable a more robust segmentation of image data affected by interference. The scope of the present disclosure is defined solely by the appended claims and is not affected to any degree by the statements within this summary. The present embodiments may obviate one or more of the drawbacks or limitations in the related art.

A method is provided to segment image data, which represents at least one predefined target object. Image data of this kind may include X-ray or magnetic resonance imaging data, for example. The image data may involve three-dimensional (3D) image data, e.g., a 3D representation of at least the target object, such as by way of a computed tomography (CT) volume or magnetic resonance (MR) imaging volume. The target object may be an anatomical element or an anatomical feature of a patient, (e.g., a bone or an organ or a respective section or extract thereof). In principle, however, the target object may ultimately involve any given object which is accessible to imaging.

In one method act, a first segmentation of the image data is generated by a provided trained algorithm. One such trained algorithm may be a trained artificial neural network or the like, for example. In this context, the algorithm or the neural network is trained to segment at least objects of type of the target object into image data. This may be achieved in a manner known per se, for example, by processing a large amount of predefined, annotated training data, in which at least one object of the type of the target object is represented and annotated in each case, as well as corresponding feedback adjustment of the algorithm, for example, by backpropagation. By the algorithm, which has been trained in this manner, it is therefore then possible for objects of the type of the target object to be identified automatically in the provided image data, and for the limits, outlines and/or associated image regions or data regions thereof to be determined or characterized in order to segment the respective target object or the image data.

In a further method act, a statistical shape and appearance model is provided, which is trained on objects of the type of the respective target object. Models of this kind are also referred to in technical language as active shape models (ASM, smart snakes), active appearance models (AAM), or active contour models (snakes). By a method of this kind, image data may be processed automatically, wherein the respective model is adjusted to the respective image data, whereby properties of the image data or objects represented in the image data may be determined. A trained statistical model being involved here means that the model has been generated based on provided training data and takes into consideration statistical distributions in this training data and/or has restrictions or constraints which are based on the training data. Thus, a constraint of this kind may be that the predefined model in each case is only or may only be deformed or adjusted point-by-point or in sections from an output state, which has not yet been adjusted to specific image data to be segmented, in a manner which is known or derived from the training data.

In a further method act, at least one interference region of the image data or in the image data is determined, in which the image data is impaired by at least one image artifact (e.g., presumably). In this context, the at least one interference region is determined based on differences between the image data and the shape and appearance model. To this end, in particular, the shape and appearance model may be used in an output state, e.g., before the shape and appearance model has been adjusted to the respective image data to be segmented.

The shape and appearance model may include a statistical, (e.g., averaged or expected), description or characterization, derived from the cited training data, of objects of the type of the respective target object or corresponding image data. In this context, the shape and appearance model may be trained based on artifact-free image data. This is not necessarily a prerequisite, however, as artifacts or interference may vary in their specifics and/or their position over a large number of image datasets, particularly if the image datasets originate from different patients, have been recorded by different imaging devices and/or had been recorded at different points in time. A variation or distribution of this kind may then lead to there not being any interference, e.g., no artifact, at any given point of the image data in most image datasets provided as training data, and therefore accordingly no interference or no artifact being expected by the shape and appearance model at this point.

An interference region may be a region or extract of the image data, which only contains impaired image values, e.g., image values which have been modified by the respective artifact. In some examples, the interference region may include a predefined surrounding area or a predefined radius around an interference, e.g., the respective artifact. As a result, the interference or artifacts and image values which have been modified or influenced thereby may be captured by the respective interference range in a particularly reliable manner, e.g., may be contained in the respective interference region. Possibilities for how the at least one interference region may be determined in the image data are explained in more detail further below.

In a further method act, a final segmentation of the target object or of the image data is generated by adjusting the shape and appearance model to the target object or to the image data outside, (e.g., only outside), the at least one interference region and by using the first segmentation in the or for the at least one interference region, (e.g., only there). In other words, different segmentation methods are therefore applied in regions and combined with one another here, wherein the presence or absence of interference or artifacts in a respective region is used as a criterion for the stipulation of the regions or for the selection or use of the segmentation methods to be applied, and is evaluated.

The adjustment of the shape and appearance model to the target object or to the image data is also referred to as registration of the shape and appearance model with or to the respective image data. By way of this adjustment or registration of the shape and appearance model, this reproduces at least the respective target object, whereby the form and arrangement thereof is then determined by the correspondingly registered or adjusted shape and appearance model, which ultimately means or represents a corresponding segmentation.

The present disclosure is based on the knowledge that, when a shape and appearance model is applied directly to the respective image data, it is advantageously possible to achieve a more accurate segmentation with anatomically plausible and closed shapes, which is not always the case when using a conventional neural network, wherein this improved accuracy is not always present in the interference regions, however, in which in turn the segmentation may be more accurate or more robust by a neural network or the like.

For example, this may be due to trained algorithms, (e.g., neural networks), being able to use or take into consideration a large number of abstract features and properties of the image data, while the shape and appearance model may be reliant upon relatively few specific features, such as specific geometric features or a continuous image or gray value distribution in the image data. In the case of interference or artifacts, these specific features then do not represent actual properties of the mapped target object captured by the image data.

For example, the gray value distribution in the image data in the at least one interference region is therefore not based on a real anatomical structure of the target object, but rather is overlaid with intensity fluctuations which are not anatomically based. This therefore means that the adjustment of the shape and appearance model to the correspondingly impaired image data would then lead to the adjusted shape and appearance model not reproducing the real form and arrangement or anatomical structure of the mapped target object. This may primarily be problematic as the existence, the distribution and the specifics of interference regions or artifacts may vary significantly over time and/or over various sets of image data, (e.g., of different patients), and therefore cannot be mapped completely or reliably in the training of the shape and appearance model.

Particularly when the image data involves CT or MR data, it is possible for interference regions in the context of the present disclosure to be generated by metallic objects in the mapping volume, for example, by metallic implants or metallic medical devices or instruments.

It has been possible to prove that a segmentation by a trained algorithm in the context of the present disclosure may be more robust to interference of this kind.

A trained algorithm in the context of the present disclosure represents a machine learning method, but here is explicitly not intended to include shape and appearance models in the context of the present disclosure.

In principle, it may be possible to adjust the shape and appearance model to the first segmentation generated by the trained algorithm, and not directly to the underlying original image data, over the entire target object or the entire image data. By way of an intermediate act of this kind in the segmentation or registration process, however, the ultimate accuracy of the segmentation may be reduced overall, in particular, outside the interference regions, e.g., in unimpaired regions of the image data, which may form the largest part of the image data and also the largest part of a region of the image data which represents the target object.

Overall, it is therefore advantageously possible for the overall or average accuracy of the segmentation to also be improved for problematic image data, e.g., which is impaired or affected by artifacts. In particular, this may be achieved with a feasible outlay, as the provided shape and appearance model only has to be generated once in its output form or its output state and may then be used for different patients or image datasets. In this context, for each patient or each set of image data to be segmented, for example, a new instance of the shape and appearance model may be generated and used, for example, by simple copying. Advantageously, it is therefore not necessary to subsequently train the shape and appearance model to the respective individual dataset, e.g., the image data to be segmented in each case. Therefore, using the same shape and appearance model and the same trained algorithm in each case, it is possible for the present disclosure to be used in a beneficial manner for different issues, in which for example a position of interfering objects, such as metallic interfering objects, varies, (e.g., for fixing bone fractures or the like).

In an advantageous embodiment, the shape and appearance model includes a shape model portion (ASM), which is based on a point distribution model (PDM), and an appearance model portion (AAM), which describes or contains image values in an object surrounding area. These image values may be a gray value distribution, which locally, e.g., at each point of the vast object, stand perpendicular to the surface thereof in each case, e.g., may be defined. In other words, here, the shape and appearance model is therefore a combined or expanded model. Due to the different portions, the shape and appearance model provided here advantageously offers a particularly great flexibility and advantageously enables a particularly accurate adjustment to the respective target object or the respective image data. The shape model portion or the ASM may be or contain a statistical model of an object or of the outer limit, contour, and/or surface thereof, and may be deformed in an iterative process in order to adjust to a specific corresponding object, e.g., here the target object represented in the image data.

In this context, such a deformation, e.g., the shape or form which may be assumed or reproduced by the ASM, is restricted by a PDM predefined as part of the shape model portion. Thus, the shape of the respective object may be represented or described by a set or a quantity of points or the positions thereof, which, or the arrangement thereof, is controlled by the model. The shape model portion therefore at least substantially or exclusively takes into account geometric features for the adjustment to the respective target object.

The appearance model portion, by contrast, is or includes an AAM, which takes into consideration image or intensity values, (e.g., gray values), of the image data for the adjustment to the respective target object or to the respective image data provided. The AAM may likewise take into consideration a surface or texture of the respective target object and/or other regions of the image data, (e.g., a surrounding area of the respective target object), during the adjustment. The AAM or the shape and appearance model overall may therefore be regarded or understood as machine vision or image comprehension (e.g., computer vision). In this context, the AAM, (e.g., the appearance model portion), does not or does not only take into consideration geometric features, factors, or limitations, but does consider or does also consider an appearance image or look or a texture of the object or the image data.

In an advantageous development, a preliminary second segmentation of the image data is generated by adjusting the shape and appearance model by the shape model portion to a shape of the target object determined by the first segmentation, e.g., by the trained algorithm. In other words, here, after the first segmentation, a preliminary adjustment of the shape and appearance model is therefore performed before the final segmentation is generated. This preliminary adjustment delivers a preliminary registration or a preliminary or first estimation of the registration of the shape and appearance model to the image data as a result.

The final segmentation or registration may then build upon this preliminary segmentation or registration, e.g., start from the shape and appearance model preliminarily adjusted.

By way of the multi-stage registration of the shape and appearance model provided here and the use of the first segmentation which is available in any case in the present method as a basis or reference for the preliminary second segmentation, it is possible to achieve an improved efficiency and speed of execution of the method. The first segmentation may have clearer lines, contours or shapes, less noise and/or image interference or ambiguity than the underlying original image data. This makes it possible to accelerate a convergence of the shape and appearance model or the shape model portion as part of the preliminary second segmentation compared to using the original image data.

In an advantageous development, in order to generate the final segmentation outside the at least one interference region, the shape and appearance model preliminarily adjusted is finely adjusted to the target object according to the image data by the appearance model portion. In other words, the preliminary second segmentation is therefore used as the starting point for the final segmentation. In this second act or part of the registration of the shape and appearance model, in this context, it is not the first segmentation which is used as an advisor or specified target to be achieved, but rather the underlying original image data. This advantageously makes it possible to perform the first segmentation by a conventional trained algorithm, (e.g., a conventional convolutional neural network (CNN) trained for image segmentation), and nevertheless to use the image values, which may only be fully contained in the underlying image data and not in a result or output of the trained neural network, in order to achieve an adjustment of the shape and appearance model which is as accurate as possible and thus a particularly accurate segmentation. Therefore, not only are geometric features or information used or taken into consideration here, but also appearance, texture, or surface information by way of the appearance model portion. An outlay associated therewith may advantageously be kept particularly low here, as the shape and appearance model which has already been preliminarily adjusted is used as a starting point, whereby an improved efficiency of execution and speed of execution may ultimately likewise be produced for the present disclosure.

In a further advantageous embodiment, in order to determine the at least one interference region, a cross-correlation between image values of the image data and image values described by the provided shape and appearance model or contained or indicated therein is used or evaluated. In other words, it may therefore be determined in regions to what degree or how strongly the image data correlates with the statistically based, expected, corresponding data or image values according to the provided shape and appearance model. A particularly weak or low correlation, (e.g., lying below a predefined threshold value), in a particular region of the image data may then be interpreted as the presence of an interference or an artifact in the region. This may already be successfully performed before the adjustment of the shape and appearance model to the image data or to the target object represented therein, as image values in an interference region may be significantly larger than all the purely anatomically based image values, particularly if the respective interference is caused by a metallic interfering object. The use of the cross-correlation provided here may advantageously enable a more accurate and more reliable determination of any interference regions possibly present than, for example, a simple threshold value filtering applied directly to the image data to be segmented. This may be the case, for example, as sections or courses with significantly varying image values or gray values may even occur in interference-free or artifact-free image data regions, for example, depending upon the type of target object mapped.

In an advantageous development, the cross-correlation is used in a standardized form according to the following equation:

$$\rho_{XX}(t_1, t_2) = \frac{K_{XX}(t_1, t_2)}{\sigma_X(t_1)\sigma_X(t_2)} = \frac{E[(X_{t_1} - \mu_{t_1})(X_{t_2} - \mu_{t_2})]}{\sigma_X(t_1)\sigma_X(t_2)}.$$

In this context, $\rho$ indicates the value of the standardized cross-correlation, K the value of the non-standardized cross-correlation, $X(t_1)$ and $X_{t1}$ a spatially-resolved image or gray value distribution of the image data, $X(t_2)$ and $X_{t2}$ a spatially-resolved image or gray value distribution according to the provided shape and appearance model (10), $\sigma$ the respective standard deviation, E the expected value and $\mu$ the respective average value.

Here, the cross-correlation is determined between a first signal, which indicates the image or gray value distribution, (e.g., perpendicular to the object surface), according to the original image data, and a second signal, which indicates the image or gray value distribution, (e.g., perpendicular to the object surface), according to the shape and appearance model. In this context, the corresponding values or signals are average-adjusted and standardized based on standard deviations. With this approach, experience has shown that a particularly reliable and robust determination of the interference regions is advantageously produced.

In a further advantageous embodiment, the at least one interference region is determined based on a predefined threshold value, in particular, for image values or for an image value difference or for a correlation between the image data and the shape and appearance model. For example, regions of the image data in which at least one image value or a plurality or all of the image values are greater than the predefined threshold value, and/or regions in which a difference or deviation between at least one image value or some or all of the image values of the image data and corresponding image values according to the shape and appearance model are greater than the predefined threshold value, and/or regions in which the correlation between the image data and the shape and appearance model or image values thereof is smaller than the predefined threshold value, are determined or defined as the interference region. Such a threshold-value-based determination of the at least one interference region may advantageously be performed in a particularly simple, accurate, reliable, and rapid manner. At the same time, this procedure advantageously offers a particularly effective flexibility and adjustability of the method proposed, as the behavior or the results of the method may be adjusted or set, e.g., optimized, by adjusting a single value, namely the predefined threshold value.

In an advantageous development, the threshold value is stipulated as a multiple of a variance of a noise level in training data used to generate the shape and appearance model. In other words, it may therefore be provided that an image value of the image data to be segmented is identified as interference or an artifact, if this is n times greater than the corresponding image value stored or provided in the shape and appearance model, where n is a predefined number. As a result of the variance of the noise being used as a reference or base value, by way of the threshold value, it is advantageously possible for a signal-to-noise ratio or a signal distance to be defined or set in a particularly simple and clear manner, in order to determine the at least one interference region. Particularly where n>1 or n>2, for example, in this context, the identification of actual interference regions may be particularly reliable and robust, so that in particular misidentifications (e.g., false positives) may be suppressed in a particularly reliable manner.

Regardless of the remaining embodiment, the threshold value may be predefined or stipulated as a function of an expected or predefined type of interference or artifacts, which are present or expected in the image data to be segmented, e.g., as a function of a cause of this interference or artifacts. For example, if metal artifacts are involved, e.g., interference caused by metallic objects in the recording volume, then the threshold value may be stipulated as a function of the type of the respective metal or material. If an artifact-causing interfering object has a significant iron component or includes for the most part of iron, for example, then a larger threshold value may be stipulated for the correlation or a smaller threshold value for the deviation or difference between the image values than for when the artifact-causing interfering object includes at least for the most part of a light metal, (e.g., aluminum or titanium).

In a further advantageous embodiment, the at least one interference region is determined automatically by a second trained algorithm, in particular, a second trained artificial neural network. In this context, this second trained algorithm is trained based on training data affected by artifacts to identify, (e.g., localize), corresponding interference regions in image data. Such a use of a trained algorithm, (e.g., a machine learning facility or method), may advantageously enable a particularly simple and consistent determination of interference regions. Thus, for example, a respective user or operator does not have to stipulate or adjust a threshold value manually. In this context, however, a certain degree of flexibility is preserved, as the trained algorithm may be subsequently trained on different applications or scenarios as required.

The second trained algorithm may be trained in with methods known per se, for example, by backpropagation.

The image data may be provided or input to the second trained algorithm as input data. The second trained algorithm may output, for example, coordinate or region indications for each possibly identified interference region, or modified image data, for example, provided with a respective contour or line or color coding or the like marking an identified interference region, as output data. This output data may then be used as parameters in the method. In certain examples, the second trained algorithm may include a convolutional neural network (CNN), as experience has shown that particularly good results may be achieved thereby.

A further aspect of the present disclosure is an image processing apparatus for the segmentation of image data, which represents at least one predefined target object. The image processing apparatus or facility includes at least one input data interface for receiving the respective image data. The image processing apparatus further includes a trained algorithm, (e.g., a trained artificial neural network), which is trained to identify or to segment at least objects of the type of the target object in image data. The image processing apparatus further includes a data storage device, in which a predefined shape and appearance model, which is trained on objects of the type of the target object, is stored. The image processing apparatus further includes a processor facility for executing the trained algorithm and for adjusting the shape and appearance model. In this context, the image processing facility is configured to carry out at least one variant or embodiment of the method in an automatic or semi-automated manner. Accordingly, the image processing apparatus or facility may therefore have some or all of the constituent parts, features, and/or properties mentioned in association with the method and/or further aspect of the present disclosure. Conversely, the constituent parts or components of the image processing apparatus may be or correspond to the corresponding constituent parts or components mentioned in association with the method.

The individual constituent parts or components of the image processing facility or apparatus may be interconnected via corresponding data connections. The mentioned data interfaces may be hardware and/or software interfaces.

A result generated by the image processing facility when processing the image data to be segmented may be stored automatically, (e.g., on the data storage device), and/or output via an output data interface of the image processing apparatus.

The method acts of the method may be carried out by the processor facility of the image processing apparatus using one or more of the remaining constituent parts or components of the image processing facility. The processor facility may include a microprocessor, a microchip, an FPGA, an integrated circuit, a hardware circuit, and/or others of this kind. In particular, the image processing facility may be or include a computer or a real or virtual group of computers.

A further aspect of the present disclosure is a computer program product which includes commands or control instructions which, when executed by a computer, (e.g., by the image processing apparatus or the data processing facility thereof), cause this computer or the image processing apparatus to carry out at least one variant or embodiment of the method, (e.g., automatically or semi-automatically). The computer program product may be a computer program, which may be loaded directly into a storage device of the computer or of the image processing apparatus, with program code or modules for carrying out the acts of the method when the computer program is executed by the computer or by the image processing apparatus. The computer program is therefore able to encode or implement the method. In other words, the method may be a computer-implemented method, in part or in full. The computer program, (e.g., a corresponding program code), may be stored on the data storage device of the image processing apparatus.

Likewise, the computer program product may be a computer-readable data carrier, on which a corresponding computer program or a corresponding program code is stored. The image processing apparatus may then have a computer-readable data carrier of this kind, for example, in the form or as part of the mentioned data storage device of the image processing apparatus.

Also forming part of the disclosure are developments of the various aspects of the disclosure, in particular of the method, of the image processing apparatus and of the computer program product, which have features as are only described in association with one or some of these aspects of the disclosure. In order to avoid unnecessary redundancy, the corresponding developments of the present disclosure or the individual aspects thereof are not described separately here once again for all of these aspects.

The disclosure also includes the combinations of the features of the embodiments described.

BRIEF DESCRIPTION OF THE DRAWINGS

The above-described properties, features, and advantages of the present disclosure, as well as the manner in which they are achieved, will become more clearly and easily intelligible in conjunction with the following description of exemplary embodiments, which are explained in more detail in conjunction with the drawings. This description does not restrict the disclosure to these exemplary embodiments. The figures are in general not to scale.

FIG. 1 depicts a schematic representation of an example of an imaging device.

FIG. 2 depicts an exemplary schematic flow diagram for a method for the segmentation of image data by the imaging device.

DETAILED DESCRIPTION

In the exemplary embodiments, the described components of the embodiments each represent individual features of the disclosure, which are to be considered independently of one another and in each case also develop the disclosure independently of one another. For this reason, the disclosure is also intended to include other combinations of the features of the embodiments than those shown. In addition, further features of the disclosure that have already been described may also be added to the described embodiments.

FIG. 1 depicts a schematic representation of an imaging device 1. For example, the imaging device 1 may be a computed tomography unit or a magnetic resonance system or the like, which in any case serves to record or capture image data of a patient 2. In this image data, a predefined target object, (e.g., a bone or a predefined tissue region of the patient 2), may be mapped in this context. In the present example, the imaging device 1 includes a data processing facility 3. The data processing facility 3 may be an image processing apparatus for the processing or further processing of image data provided to it, for example recorded or generated by the imaging device 1. The data processing facility 3 may likewise be configured to generate or reconstruct the image data from raw data or measurement data recorded by the imaging device 1.

Here, to receive the raw data or image data, the data processing facility 3 includes an input data interface 4, a processor 5 connected thereto, and a data storage device 6 connected thereto. In the present example, a program 7, a predefined trained first neural network 8, a predefined trained second neural network 9, and a shape and appearance model 10 are stored on the data storage device 6. The program 7 may be executed by the processor 5 in order to segment the image data, and therefore encode or implement corresponding method or program acts. The shape and appearance model 10 includes a shape model portion, (which is referred to as active shape model or ASM 11 for short here), and an appearance model portion, (which is referred to as active appearance model or AAM 12 for short here).

The data processing facility 3 or the imaging device 1 is configured to perform or generate a segmentation of image data of the patient 2, at least in a semi-automated manner. A result arising in this context, e.g., a final segmentation, may be output via an output data interface 13 of the data processing facility 3, for instance to another device or program or to an output facility 14, which is likewise shown in a schematic manner by way of example here.

The data processing facility 3 may have hardware elements, as well as software elements. For example, the data interfaces 4, 13 may each be embodied as a hardware and/or software interface (for example, PCI bus, USB, FireWire, or others of this kind). The processor 5 may be a microprocessor or what is known as an FPGA (field programmable gate array) or the like, for example. The data storage device 6 may be realized as a non-permanent data storage device (RAM, random access memory) or as permanent mass storage, (e.g., as a hard drive, USB stick, SD card, solid state drive, or the like, or as a combination thereof).

The method for the segmentation of the image data which may be executed by the data processing facility 3 or the imaging device 1, e.g., the program 7 for instance, and an interaction of the components of the imaging device 1 or the data processing facility 3 which occurs in this context, are to be explained in the following with reference to FIG. 1 and FIG. 2.

For this purpose, FIG. 2 depicts an exemplary schematic flow diagram 15 for a corresponding method with method acts S1 to S10. The method acts S1 to S10 shown schematically in FIG. 2, or some of these, may be or represent corresponding functions or program modules of the data processing facility 3, the program 7 or the imaging device 1.

Models such as the ASM 11 and the AAM 12 represent statistical methods, or may be used in statistical methods, in order to describe objects, (e.g., 3D objects), which may be subject to a variance or may have a variance as variations. Objects of this kind may for example be bones or organs, e.g., the target object mapped in the image data of the patient 2 in the present example. With the aid of predefined parameters, the models 11, 12 may be adjusted to the target object in each case, in order to reproduce the shape or form thereof. As a result of this procedure, a corresponding segmentation is then obtained.

In method act S1, annotated training image data is first provided, which represents objects of the type of the present target object. Based on this training image data, the models 11, 12 are trained. This may be performed by a separate training facility, for example a computer configured for this purpose, or by the data processing facility 3.

For example, in parallel therewith, the training image data or further training image data may likewise be provided with objects of the type of the target object in method act S2. Based on this training image data, the first neural network 8 is trained to identify and segment the image data or the objects represented therein of the type of the target object. To this end, it is likewise possible to use the training facility, or a corresponding training facility, for example, a computer configured for this purpose, or the data processing facility 3.

For example, in parallel therewith, the training image data or further image data, which has been affected by artifacts, is likewise provided in the present example in method act S3. The second neural network 9 is thus trained to identify and localize interference regions, (e.g., artifacts), in image data. For this purpose, it is also possible to use the or a training facility, (e.g., a computer configured for this purpose), or the data processing facility 3. Method act S3 may be optional here.

The models 11, 12 trained in this way and the neural networks 8, 9 trained in this way are then loaded into the data storage device or stored therein.

In method act S4, the mentioned image data of the patient 2 is recorded and provided to the image processing facility 3 via the input data interface 4. Likewise, the image data already may be ready in a storage facility and then be called by the data processing facility 3 via the input data interface 4.

In method act S5, the image data of the patient 2 is processed by the first neural network 8, (e.g., segmented), wherein a first segmentation of the image data is generated as a result or as output data of the first neural network 8. In order to already achieve as good a result as possible here, the first neural network 8 may be trained specifically on an anatomy to be detected in the respective application case, or the like.

For example, in parallel therewith, in method act S6 the image data is processed by the second neural network 9 in order to identify and localize artifacts or interference regions in the image data. Additionally, or alternatively, in method act S6, a cross-correlation of the image data with image values or image data stored in the shape and appearance model 10, particularly in the AAM 12, may be performed and evaluated by the processor 5. A threshold value filtering with a predefined threshold value may then be applied to the cross-correlation thereby determined or corresponding cross-correlation values, in order to detect or define the interference regions.

If both methods for the determination of the interference regions mentioned here are applied, then the respectively determined interference regions may be compared against one another and/or used for one-sided or mutual plausibility checks, for example. Ultimately, all of the interference regions detected by at least one of the two methods, or only the interference regions detected by both methods may be used as interference regions. Based on the different modes of operation of the two methods, these may identify or define interference regions which differ from one another for a particular artifact, (e.g., with regard to its shape, size, and/or arrangement). It is then possible, for example, to use a combination or sum or an average value of the two differing interference regions as interference region for this artifact. This ultimately makes it possible to realize a particularly robust definition and localization of any present interference regions.

In method act S7, a preliminary adjustment or registration of the shape and appearance model 10 takes place. In this context, the ASM 11 is adjusted to the first segmentation generated in method act S5 in a deformable manner. Here, a preliminary registration of the ASM 11 or the shape and appearance model 10 is thus performed based on the first segmentation generated by the first neural network 8. As a result, a preliminary second segmentation or a preliminary or estimated registration of the shape and appearance model 10 is produced.

In method act S8, a fine adjustment of the shape and appearance model 10 is performed outside the previously determined interference regions, starting from the preliminary second segmentation, or starting from the preliminarily adjusted or preliminarily registered shape and appearance model 10. In this context, the AAM 12, in particular the gray value distribution, which is stored therein or described thereby, in the region and/or in a predefined surrounding area of the target object according to the preliminarily adjusted or preliminarily registered ASM 11, or a gray value distribution as has been learned by the AAM 12 based on the training data provided for generating the AAM 12, as well as the image or gray value distribution of the image data are used. As a result, an improved registration of the shape and appearance model 10 or a corresponding improved segmentation, at least outside the interference regions, is obtained here.

In method act S9, the final segmentation of the target object or the image data is generated from this improved registration or segmentation, for the regions or parts of the image data lying outside the interference regions, and from the first segmentation, for the regions or parts of the image data lying inside the interference regions, by the combination thereof. The different segmentations are therefore combined in regions here, in order to obtain the final segmentation.

In method act S10, this final segmentation is provided. In this context, the final segmentation may be stored in the data storage device 6, output via the output data interface 13 and/or represented by the display facility 14. Likewise, the final segmentation may be overlaid with the original image data and/or further processed in another way.

In the case of artifacts, (e.g., in the interference regions), segmentation by the shape and appearance model 10 may lead to errors, but segmentation with the aid of the first neural network 8 may be more robust in these regions, and segmentation by the shape and appearance 10 may be more accurate or reliable than segmentation by the first neural network 8 outside the interference regions. Therefore, an optimum segmentation accuracy, (e.g., an optimized segmentation), is therefore achieved overall over the entire area or the entire region of the target object or over the entire image data, which is not or is minimally impaired by the artifacts in the underlying image data.

Overall, the examples described therefore show how a reliable registration of active shape models or active appearance models to image data may also be achieved in the presence of artifacts, in particular metal artifacts.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the disclosure has been illustrated and described in detail with the help of the disclosed embodiments, the disclosure is not limited to the disclosed examples. Other variations may be deducted by those skilled in the art without leaving the scope of protection of the claimed disclosure.

The invention claimed is:

1. A method for segmentation of image data, which represents at least one predefined target object, the method comprising:
   generating a first segmentation of the image data by a provided trained algorithm trained to segment at least objects of a type of the target object into the image data;

providing a statistical shape and appearance model trained on objects of the type of the target object;

determining at least one interference region, in which the image data is impaired by at least one image artifact, based on differences between the image data and the statistical shape and appearance model; and generating a final segmentation by adjusting the statistical shape and appearance model to the target object outside the at least one interference region and using the first segmentation in the at least one interference region.

2. The method of claim 1, wherein the statistical shape and appearance model comprises a shape model portion based on a point distribution model, and an appearance model portion describing image values in a predefined object surrounding area.

3. The method of claim 2, wherein the image values comprise a gray value distribution.

4. The method of claim 2, further comprising:
generating a preliminary second segmentation of the image data by adjusting the statistical shape and appearance model by the shape model portion to a shape of the target object determined by the first segmentation.

5. The method of claim 4, wherein, in order to generate the final segmentation outside the at least one interference region, the statistical shape and appearance model that has been preliminarily adjusted is finely adjusted to the target object according to the image data by the appearance model portion.

6. The method of claim 4, wherein, in order to determine the at least one interference region, a cross-correlation is evaluated between image values of the image data and image values described by the statistical shape and appearance model.

7. The method of claim 6, wherein the cross-correlation is used in a standardized form according to:

$$\rho_{XX}(t_1, t_2) = \frac{K_{XX}(t_1, t_2)}{\sigma_X(t_1)\sigma_X(t_2)} = \frac{E[(X_{t_1} - \mu_{t_1})(X_{t_2} - \mu_{t_2})]}{\sigma_X(t_1)\sigma_X(t_2)},$$

wherein:
ρ indicates a value of a standardized cross-correlation,
K is a value of a non-standardized cross-correlation,
$X(t_1)$ and $X_{t1}$ are spatially-resolved image value distributions of the image data,
$X(t_2)$ and $X_{t2}$ are spatially-resolved image value distributions according to the statistical shape and appearance model,
σ r is a respective standard deviation,
E is an expected value, and
μ is a respective average value.

8. The method of claim 1, wherein, in order to determine the at least one interference region, a cross-correlation is evaluated between image values of the image data and image values described by the statistical shape and appearance model.

9. The method of claim 8, wherein the cross-correlation is used in a standardized form according to:

$$\rho_{XX}(t_1, t_2) = \frac{K_{XX}(t_1, t_2)}{\sigma_X(t_1)\sigma_X(t_2)} = \frac{E[(X_{t_1} - \mu_{t_1})(X_{t_2} - \mu_{t_2})]}{\sigma_X(t_1)\sigma_X(t_2)},$$

wherein:
ρ indicates a value of a standardized cross-correlation,
K is a value of a non-standardized cross-correlation,
$X(t_1)$ and $X_{t1}$ are spatially-resolved image value distributions of the image data,
$X(t_2)$ and $X_{t2}$ are spatially-resolved image value distributions according to the statistical shape and appearance model,
σ is a respective standard deviation,
E is an expected value, and
μ is a respective average value.

10. The method of claim 1, wherein the at least one interference region is determined based on a predefined threshold value.

11. The method of claim 10, wherein the at least one interference region is determined for image values, an image value difference, or a correlation between the image data and the statistical shape and appearance model.

12. The method of claim 10, wherein the threshold value is stipulated as a multiple of a variance of a noise level in training data used to generate the statistical shape and appearance model.

13. The method of claim 1, wherein the at least one interference region is determined automatically by a second trained algorithm trained based on training data affected by artifacts to identify corresponding interference regions in image data.

14. An image processing apparatus for segmentation of image data, which represents at least one predefined target object, the image processing apparatus comprising:
an input data interface for receiving the image data;
a trained algorithm that is trained to segment at least objects of a type of the target object in the image data;
a data storage device that stores a predefined shape and appearance model that is trained on objects of the type of the target object; and
a processor facility for executing the trained algorithm and for adjusting the shape and appearance model,
wherein the image processing apparatus is configured, in an at least semi-automated manner, to:
generate a first segmentation of the image data by the trained algorithm;
determine at least one interference region, in which the image data is impaired by at least one image artifact, based on differences between the image data and the shape and appearance model; and
generate a final segmentation by adjusting the shape and appearance model to the target object outside the at least one interference region and using the first segmentation in the at least one interference region.

15. A non-transitory computer program product comprising commands which, when executed by an image processing apparatus, cause this image processing apparatus to:
generate a first segmentation of image data by a provided trained algorithm trained to segment at least objects of a type of a target object into the image data;
provide a shape and appearance model trained on objects of the type of the target object;
determine at least one interference region, in which the image data is impaired by at least one image artifact, based on differences between the image data and the shape and appearance model; and
generate a final segmentation by adjusting the shape and appearance model to the target object outside the at least one interference region and using the first segmentation in the at least one interference region.

* * * * *